(12) United States Patent
Fabbro

(10) Patent No.: US 7,884,586 B2
(45) Date of Patent: Feb. 8, 2011

(54) CONTROLLING A SWITCHING REGULATOR MODE DETERMINED BY AN IDEAL DUTY CYCLE FOR MAINTAINING HIGH EFFICIENCY FOR A WIDE INPUT VOLTAGE RANGE

(75) Inventor: Simone Fabbro, Villach (AT)

(73) Assignee: Infineon Technologies, Neibiberg (DE)

( * ) Notice: Subject to any disclaimer, the term of this patent is extended or adjusted under 35 U.S.C. 154(b) by 609 days.

(21) Appl. No.: 11/836,366

(22) Filed: Aug. 9, 2007

(65) Prior Publication Data
US 2009/0039841 A1    Feb. 12, 2009

(51) Int. Cl.
*G05F 1/618* (2006.01)
(52) U.S. Cl. .................. 323/259; 323/225; 323/299
(58) Field of Classification Search .......... 323/259, 323/299, 225, 222–224, 271
See application file for complete search history.

(56) References Cited

U.S. PATENT DOCUMENTS

| 5,134,355 | A |   | 7/1992 | Hastings |  |
|---|---|---|---|---|---|
| 5,705,920 | A | * | 1/1998 | Watanabe et al. | 323/285 |
| 6,166,527 | A |   | 12/2000 | Dwelley et al. |  |
| 6,275,016 | B1 |   | 8/2001 | Ivanov |  |
| 6,979,988 | B2 | * | 12/2005 | Sutardja et al. | 323/283 |
| 2008/0136387 | A1 | * | 6/2008 | Bertele | 323/282 |

FOREIGN PATENT DOCUMENTS

| DE | 19853626 A1 | 5/2000 |
|---|---|---|
| DE | 2008001680 | 7/2008 |

* cited by examiner

*Primary Examiner*—Harry Behm
(74) *Attorney, Agent, or Firm*—Lee & Hayes, PLLC

(57) ABSTRACT

This disclosure relates to a voltage regulator system where duty cycle value of an input voltage is measured, where the input voltage is supplied to a regulator circuit that provides a regulated output voltage. Based on a calculated ideal duty cycle, which is derived from the measure duty cycle, a determination is made as to whether the regular circuit operational mode is to be changed to achieve greater efficiency.

16 Claims, 3 Drawing Sheets

US 7,884,586 B2

CONTROLLING A SWITCHING REGULATOR MODE DETERMINED BY AN IDEAL DUTY CYCLE FOR MAINTAINING HIGH EFFICIENCY FOR A WIDE INPUT VOLTAGE RANGE

BACKGROUND

As electronic portable devices continue to evolve in technical complexity, so do power requirements of such devices. For example, electronic portable devices, such as digital cameras, may accept different battery power supplies (i.e., batteries) from different suppliers. Different batteries may have different voltage ranges. Furthermore, the voltage range of the same battery type may get wider with as manufacturing technology progresses. However, an electronic device has a fixed or regulated output voltage. Therefore, in order for an electronic device to be competitive on the market, it should support broad input voltage ranges and different kinds of batteries. The input voltage from such batteries should be converted and regulated so that good efficiency figures are realized. In other words, there should not be significant power loss or power degradation when adjusting for varying voltage ranges and voltage duty cycles. In addition, because the output voltage is fixed or regulated, it is desirable to avoid wide variations at the output voltage.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Disclosed herein are techniques for regulating output voltage for a portable electronic device to support a wide input voltage range from a battery source. In one described implementation, where a switching DC to DC power converter is considered, an ideal duty cycle calculator calculates an ideal duty cycle value based on an input voltage and output voltage of a regulator circuit, and a duty cycle monitor and mode changer receives a duty cycle based on the ideal duty cycle value and an adjusted error signal, based on a feedback signal, and changes operational mode of the regulator circuit based on the received duty cycle. The ideal duty cycle differs from the one finally used in the conversion in that the final "real duty cycle" is obtained by the combination of the ideal duty cycle with the error signal based on a feedback signal. In this way the ideal duty cycle is calculated as if the conversion system was lossless and the offset to be added to ideal duty cycle to compensate for the losses is given by the error signal dependent on the feedback of the output voltage to the error amplifier. As discussed above, the summation/combination of ideal duty cycle with the error signal generates a signal coding the final real duty cycle used by the converter.

The techniques described herein may be implemented in a number of ways. One example environment and context is provided below with reference to the included figures and on going discussion.

Overview

A voltage regulator is implemented that supports a wide input voltage range, and provides a supply voltage at the output which is higher than a minimum specified input voltage and lower than a maximum specified input voltage with considerably high power conversion efficiency.

Exemplary System

Figure 1:
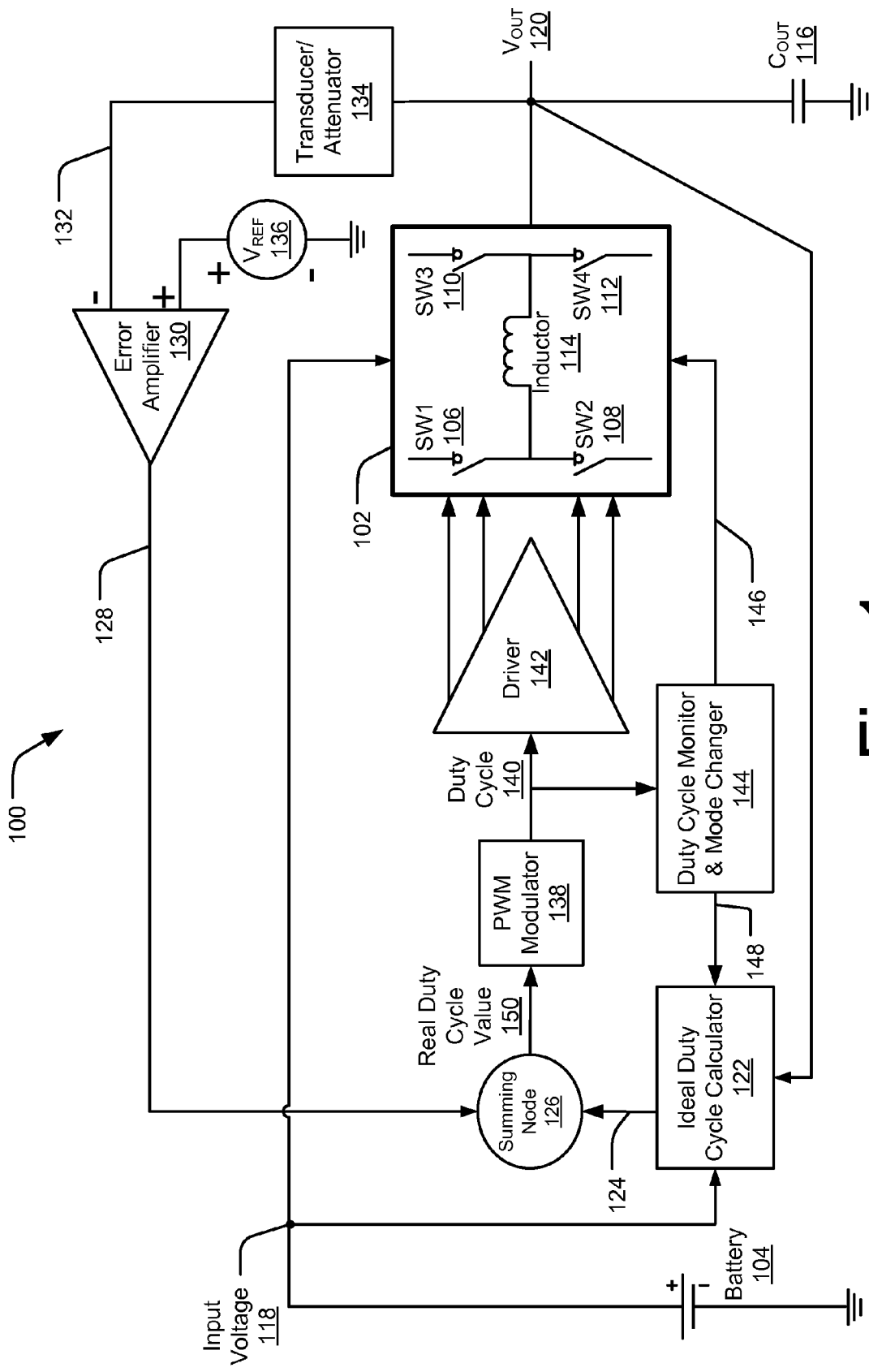
FIG. 1 shows an exemplary output voltage regulator system for maintaining high efficiency for a wide input voltage range.

FIG. 1 illustrates an exemplary output voltage regulator system 100 for maintaining high efficiency for a wide input voltage range. Output voltage regulator system 100 may be implemented as part of various electronic devices, including portable electronic devices, such as digital cameras. In such electronic devices, a voltage regulator circuit may be implemented as represented by circuit 102. The voltage regulator circuit 102 particularly is a power converter converting an input power to an output power. In this example, circuit 102 receives an input voltage from a battery power supply or battery 104. Battery 104 may be one of various batteries having varying input voltage ranges.

In this example, circuit 102 is a non inverting buck-boost converter which includes an H-bridge circuit having switches SW1 106, SW2 108, SW3 110, and SW4 112. As will be appreciated by one skill in the art, circuit 102 may include different circuits. The particular example of a non inverting buck-boost converter is discussed for merely illustrative purposes.

An inductor 114 is placed between two half bridges, where one bridge includes SW1 106 and SW2 108, and the other bridge includes SW3 110 and SW4 112. The voltage regular circuit 102 generates a voltage at $C_{OUT}$ 116 which may be either higher or lower than the voltage at battery 104, depending on how and with which duty cycle switches SW1 106, SW2 108, SW3 110 and SW4 112 are operated. For example, assuming a "classic" buck-boost operation, when both switch SW1 106 and switch SW4 112 are closed, magnetic flux is built up in the inductor 114. When both switch SW2 108 and switch SW3 110 are closed, energy (i.e., voltage) is delivered to $C_{OUT}$ 116. This is a "classic" buck-boost operation, where switches SW1 106, SW4 112 and switches SW2 108, SW3 110 are used in combination. There may be other implementations, involving 4 switches, able to accomplish a buck-boost function (input voltage higher or lower than output voltage) by combining the different switches in different ways and with different duty cycles than in the said "classic" buck-boost operation.

There may be power losses with the use of four switches (i.e., four-switch operation), affecting efficiency of system 100. Such losses include inherent resistive losses, charge transfer losses and switching losses. A solution to avoid or minimize charge transfer losses and switching losses includes selective full operation of the switches SW1 106, SW3 110 and SW2 108, SW4 112 with 100% duty cycle or 0% duty cycle respectively. In particular, full operation of the switches SW1 106, SW2 108, SW3 110, and SW4 112 can be selected with respect to the magnitude of the input voltage, such as the magnitude of the input voltage 118. In other words, the voltage regulator circuit 102 operates in different switch modes depending on input voltage operation. In particular, in "buck mode" operation, the H-bridge of voltage regulator circuit 102 is operated so the half bridge SW1 106 and SW2 108

(which may be referred to as a "buck branch") is operative (i.e., SW1 106 and SW2 108 are allowed to open and close with a certain duty cycle related to the input voltage 118), while SW4 112 is always closed and SW3 110 is always open. In "boost mode" operation, the H-bridge is operated such that the other half bridge of SW3 110 and SW4 112 (which may be referred to as a "boost branch") is operative (i.e., SW3 110 and SW4 112 are allowed to open and close with a certain duty cycle related to the input voltage 118), while SW1 106 is always closed and SW2 108 is always open.

The four switches SW1 106, SW2 108, SW3 110, and SW4 112, may all be operative in different ways, combinations and with different duty cycle (i.e., "buck-boost mode") for cases when input voltage 118, is approximate to output voltage $V_{OUT}$ 120 within a range for which duty cycle for the either buck mode or boost mode is too close to maximum or minimum to guarantee sufficient regulation performance. Limiting the four switch operation only to a certain reduced input voltage range can result in a better efficiency outside a limited input voltage range; however, the very wide input voltage range, may involve large differences in duty cycle value corresponding to the mentioned conversion modes (buck, boost, buck-boost). A plain and sudden change between different operation modes (e.g., going between buck and buck-boost and between buck-boost and boost modes) can correspond to wide step transient responses of the duty cycle which, according to an inherent control time constant, could result in large output voltage deviations at $V_{OUT}$ 120.

In order to go between modes (e.g., buck mode, boost mode, and buck-boost mode), a determination is made as to the magnitude of voltage at input voltage 118. The determination may be made by directly or indirectly checking a current duty cycle value, or by directly or indirectly checking the current input voltage 118. It may be preferable to check duty cycle value, because a possible saturation condition is also checked (when the duty cycle may exceed the limits of 0% and 100%), where such a saturation condition is only partially dependent on the input voltage 118 or output voltage $V_{OUT}$ 120, since only considering input and output voltages does not take the power losses into account. When checking duty cycle value, the input voltage 118 is indirectly checked.

When going between different operation modes, it is desirable to maintain "bumpless" or smooth transitions with respect to output voltage $V_{OUT}$ 120. In other words, for the same input voltage value (e.g., input voltage 118) and output voltage value (e.g., $V_{OUT}$ 120), different operation modes may correspond with much different duty cycle values. Executing a change between operation modes (i.e., suddenly changing the arrangement/operation of the switches), would imply a very large change in the duty cycle from one mode to another, resulting in unacceptable overshoots/undershoots at the output voltage $V_{OUT}$ 120, caused by the limited speed with which the regulation loop would react.

In an implementation, deciding when mode changes take place is based on an observation of existing or present duty cycle related to the current conversion mode (switch arrangement). For example, starting from a condition where input voltage 118 is higher than the output voltage at $V_{OUT}$ 120, and the input voltage input voltage 118 decreases progressively by coming from above (i.e., higher voltage value) and comes near to the output voltage at $V_{OUT}$ 120, the decision to go from a two-switch operation (i.e., buck mode) to a four-switch operation (i.e., buck-boost mode) is taken when the duty cycle becomes bigger than a certain threshold which guarantees acceptable dynamic performances for lower values of duty cycle.

In a similar manner, starting from a condition where the input voltage 118 is smaller and increasing then the output voltage at $V_{OUT}$ 120, the decision to go from the two-switch operation (i.e., boost mode) to a four-switch operation (i.e., buck-boost mode) is determined when the duty cycle becomes smaller than a certain threshold. Duty cycle threshold transitions are further discussed below.

While system 100 is operative (i.e., in running mode), an ideal duty cycle is mathematically calculated by an ideal duty cycle calculator 122, according to the input voltage 118, to a desired output voltage at $V_{OUT}$ 120 and to the current running conversion mode (switch arrangement). A signal 124 representing the ideal duty cycle is generated and summed at summing node 126, to a signal 128 at the output of an error amplifier 130. The error amplifier 130 accomplishes feedback control by comparing a signal 132 related to the output voltage $V_{OUT}$ 120, which may be attenuated by a transducer/attenuator 134, to a certain reference voltage $V_{REF}$ 136. The summation/combination of the signals 124 and 128 gives the value for the real duty cycle 150, whose two contributors are thus the ideal duty cycle, calculated as if the system was lossless (since it depends only on input and output voltage), and an offset generated by the error amplifier, compensating for the power losses.

A pulse-width modulation (PWM) modulator 138 imposes or generates a duty cycle signal 140, according to the real duty cycle value 150, that is passed on to a driver 142. In particular, the information about the input voltage 118 enclosed in the real duty cycle 150 fully comes from the signal 124 which is directly dependent on the input voltage 118 through the ideal duty cycle calculator 124 and does not involve the feedback loop (signals 132 and 128) at all. In this way the error amplifier 130 does not have to address all of the effects due to input line variation. The error amplifier 130 regulates its output signal 138 in order to adjust the duty cycle, thereby compensating the power losses that occur in conversion (e.g., when switching between operation mode). This allows the duty cycle 122 to independently calculate the ideal duty cycle according to the input voltage 118, the desired output voltage at $V_{OUT}$ 120, and the current operating mode by neglecting the losses, which are dynamically compensated by the control loop that includes error amplifier 130. In this way, when switching between two different operation modes, the ideal duty cycle is immediately adapted to its ideal value from one mode to another, thereby causing modest effects on the dynamic variation of the output voltage at $V_{OUT}$ 120, which are related to losses that are compensated by the error amplifier 130. In other words, a "bumpless" transition is realized. A transient may be seen at $V_{OUT}$ 120 and is related to a small change of the duty cycle determined by the feedback loop of system 100, when the change in duty used to compensate for the power conversion losses. The described approach further implements "feed forward" compensation, such that the independent ideal duty cycle calculation performed at the ideal duty cycle calculator 122 reduces the effects of input line variations at $V_{OUT}$ 120 going through a path which is independent from the feedback.

A duty cycle monitor and mode changer 144 provides a signal 146 to set switch operation at circuit 102, in particular two-switch buck mode operation, four-switch buck-boost mode operation, or two-switch boost mode operation. Changing operation modes is performed by the duty cycle monitor and mode changer 144 by receiving a present value of the duty cycle 140 (and eventually signal 150) and comparing it with thresholds defined so that the regulation performance at the boundaries are satisfied. The thresholds are further discussed below. The ideal duty cycle calculator 122 generates a signal representing the value of the ideal duty cycle, as provided in signal 148, according to input voltage 118, output voltage $V_{OUT}$ 120 and currently operating mode. In an implementation, the ideal duty cycle calculator 122 can also base its calculation relative to a scaled version of the reference voltage $V_{REF}$ 136 instead of using the output voltage $V_{OUT}$ 120 directly, thereby avoiding a parasitic loop.

As discussed above the signal 124 from the ideal duty cycle calculator 122, is summed with the signal 128 from the error amplifier 130 at the summing node 126, and completes a closed loop control of the output voltage regulator system 100.

Duty Cycle Threshold Lookup

As discussed, it is desirable to maintain the voltage value at output voltage $V_{OUT}$ 120, regardless of the value of the voltage value provided by the battery. 104 and/or the input voltage at input voltage 118. Therefore, in order to maintain the constant value at $V_{OUT}$ 120, duty cycle is changed. When duty cycle changes the operational mode of voltage regulator circuit 102 may change to provide the desired constant value at $V_{OUT}$ 120.

The following equations describes the mathematical relationships of the ideal (lossless) duty cycle to input voltage 118 (represented as $V_{IN}$) and $V_{OUT}$ 120 (represented as $V_{OUT}$) in case of boost or buck mode (only 2 switches periodically switched):

$$\text{duty cycle} = (V_{OUT} - V_{IN})/V_{OUT}, \text{ in boost mode}$$

$$\text{duty cycle} = V_{OUT}/V_{IN}, \text{ in buck mode}$$

In buck-boost mode (4 switches periodically switched) the expression of the ideal duty cycle may be different for different switching concepts related to different/independent on and off times of the 4 involved switches. This means that the implementation of the ideal duty cycle calculator 122 must take into account the particular switching concept considered for the buck-boost 4 switch operation.

Figure 2:
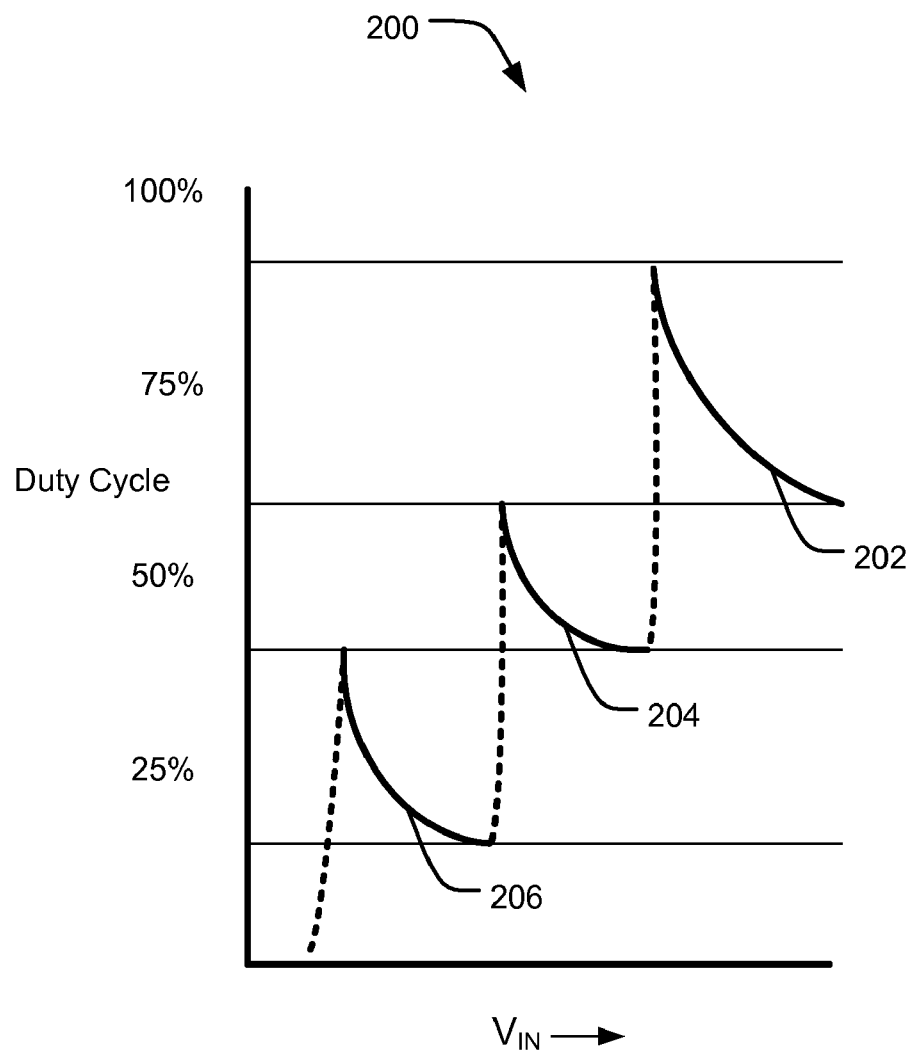
FIG. 2 shows a chart of duty cycle against input voltage $V_{IN}$ output.

FIG. 2 illustrates an exemplary chart 200 of duty cycle against input voltage $V_{IN}$. Chart 200 includes exemplary duty cycle values and associated $V_{IN}$ values where particular operation modes exist. In particular the duty cycle monitor and mode changer 144 may use such a chart 200 or values derived from chart 200 to determine when to change or go between modes. In other words, depending on the duty cycle value and the value of $V_{IN}$, duty cycle monitor and mode changer 144 instructs circuit 102 to operate in a particular mode, i.e., buck mode, buck-boost mode, and boost mode. Because $V_{OUT}$ is a constant or non-changing value, duty cycle is proportional to $V_{IN}$. Therefore, depending on duty cycle, the particular mode is chosen. In this example, line 202 represents a region in buck mode operation, where duty cycle is from 60% to 90%. Line 204 represents a region in buck-boost mode operation, where duty cycle is from 40% to 60%. Line 206 represents a region in boost mode operation, where duty cycle is from 15% to 40%.

Exemplary Process

Figure 3:
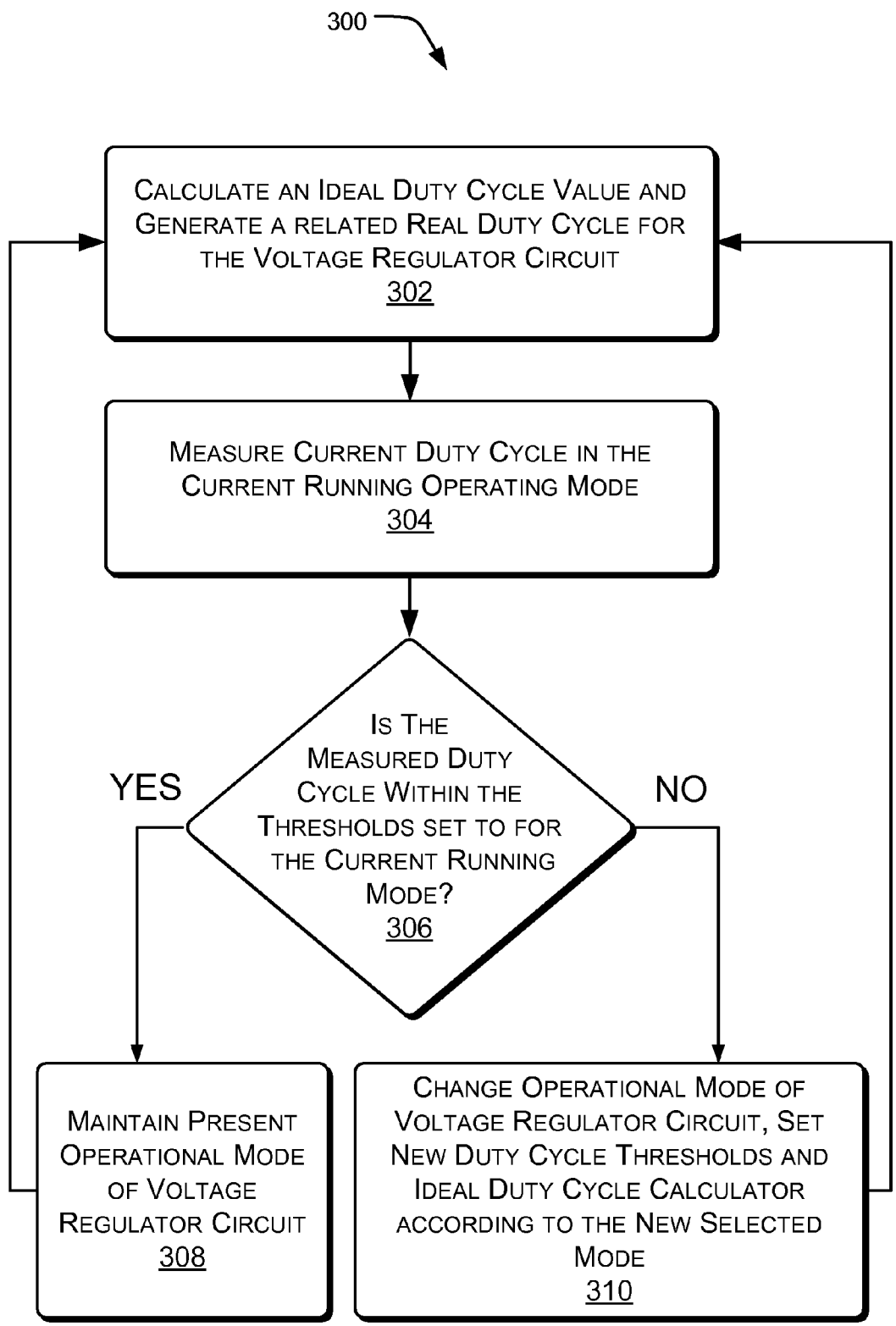
FIG. 3 is a flow diagram of a process for monitoring duty cycle on an input voltage and changing operation mode of a voltage regular circuit that provides constant value output voltage.

FIG. 3 shows one example implementation of a process 300 for monitoring duty cycle on an input voltage and changing operation mode of a voltage regulator circuit that provides constant value output voltage.

Specifics of exemplary methods are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

At 302, an ideal duty cycle in which the voltage regulator circuit is to operate is calculated. As discussed, the voltage regulator circuit may operate in different modes to accommodate varying input voltage values. In the example discussed above, voltage regulator circuit 102 is a non inverting buck-boost converter. Depending on the input voltage, which can be either larger or smaller than the output voltage, the voltage regulator circuit 102 may be in buck mode, buck-boost mode, or boost mode. An ideal duty cycle is determined for the particular mode that is presently operational. The calculating may be performed by the ideal duty cycle calculator 122. As discussed above, the calculating is based on the value of the output voltage, the value of the input voltage and the particular mode that is presently operational. The value of the calculated ideal duty cycle may also be summed up with a value coming from an error amplifier (e.g., error amplifier 130) as part of the control loop including thereby both feedback and feed forward control. Furthermore, the ideal duty cycle calculator 122 may calculate the ideal duty cycles for one or more operating cycles at the same time.

At 304 the real duty cycle (derived from the combination of the signal of the ideal duty cycle and the output signal of the error amplifier) is measured. In fact, within the same operating mode (buck, buck-boost, boost) the duty cycle is regulated according to the current input voltage and the power losses in order to keep the output voltage constant.

At 306, a determination is made whether the measured duty cycle is within a predetermined range. As discussed above, the predetermined range may be based on threshold duty cycle values that are determined for each operational mode of the voltage regular circuit. If the duty cycle is within the predetermined ranged for the ideal duty cycle (i.e., following the YES branch of 306), then at 308, the present operational mode of the voltage regulator circuit is maintained and all settings stay unchanged. If the duty cycle is not within the predetermined ranged for the ideal duty cycle (i.e., following the NO branch of 306), then at 310, the operational mode of the voltage regulator is changed to accommodate the measured duty cycle within the thresholds belonging to the just entered power conversion mode. At the same time the ideal duty cycle calculator programmed with the setting according to the just entered power conversion mode. The duty cycle checking procedure starts then again but with the new settings.

CONCLUSION

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. For example, the systems described could be configured as monitoring circuits and incorporated into various feedback and control loops. In addition, the voltage regular circuit may include other types of voltage regulator circuits in various analog and digital configurations.

What is claimed is:

1. A system comprising:
an ideal duty cycle calculator that calculates an ideal duty cycle value based on at least an input voltage of a regulator circuit and a current operating mode signal; and
a duty cycle monitor and mode changer that receives a duty cycle based on the ideal duty cycle value and an adjusted feedback dependent error voltage error value, changes an operational mode of the regulator circuit based on the received duty cycle and provides the current operating mode signal to the ideal duty cycle calculator, the ideal duty cycle value being immediately changed for the operational mode, when the operational mode is changed.

2. The system of claim 1, wherein the ideal duty cycle calculator calculates the ideal duty cycle value based on an output voltage of the regulator circuit.

3. The system of claim 1, wherein the regulator circuit is a power converter converting an input power to an output power.

4. The system of claim 1, wherein the calculation of the ideal duty cycle value also includes a reference voltage value.

5. The system of claim 1, wherein the duty cycle monitor and mode changer changes the operational mode of the regulator circuit based on a plurality of predetermined duty cycle threshold values.

6. In an electronic device having a regulated output voltage and a power supply having varying input values, the electronic device comprising:
an output voltage regulator system comprised of:
an ideal duty cycle calculator that calculates an ideal duty cycle value at least based on an input voltage of the output voltage regulating system and a current operating mode signal, the current operating mode signal being indicative of a current operating mode of the output voltage regulator system; and
a duty cycle monitor and mode changer that receives a duty cycle based on the ideal duty cycle value and an adjusted error voltage error value, and changes the current operating mode of a regulator circuit based on the received duty cycle, the ideal duty cycle value being immediately changed for the operational mode, when the operational mode is changed, the ideal duty cycle value being immediately changed for the operational mode, when the operational mode is changed.

7. The device of claim 6, wherein the output voltage regulator system is a feed forward loop, and wherein the ideal duty cycle value is immediately provided to the regulator circuit to affect the ideal duty cycle for an operating mode.

8. The device of claim 6, wherein the ideal duty cycle calculator calculates the ideal duty cycles for one or more operating modes of the regulator circuit at the same time.

9. The device of claim 6, wherein the calculation of the ideal duty cycle value also includes a reference voltage.

10. The device of claim 6, wherein the output voltage regulator system further comprises a PWM modulator that generates the duty cycle received by the duty cycle monitor and mode changer.

11. The device of claim 6, wherein the output voltage regulator system further comprises an error amplifier that provides the adjusted voltage error value.

12. A method comprising:
measuring a current duty cycle to a voltage regulator circuit;
calculating an ideal duty cycle value based on an input voltage and a current operating mode of the voltage regulator circuit;
determining whether the measured duty cycle is within a predetermined range for one of a number of operational modes of the voltage regulator circuit, the ideal duty cycle value being immediately changed for the operational mode, when the operational mode is changed; and
if the measured duty cycle is not within the predetermined range, changing an existing operational mode of the voltage regulator circuit, the ideal duty cycle value being immediately changed for the operational mode, when the operational mode is changed.

13. The method of claim 12, wherein measuring the current duty cycle to the voltage regulator is based on an adjusted input voltage value.

14. The method of claim 12, wherein the calculating is based on the measured duty cycle.

15. The method of claim 12, wherein the determining is based on threshold duty cycle values corresponding to the operational modes.

16. The method of claim 12, wherein the operational modes include the following: buck mode, buck-boost mode, and boost mode.

* * * * *